United States Patent [19]

Laurer et al.

[11] 4,421,978
[45] Dec. 20, 1983

[54] DECODING METHOD FOR MULTICHARACTER LABELS

[75] Inventors: George J. Laurer, Raleigh; Olen L. Stokes, Jr., Cary, both of N.C.

[73] Assignee: International Business Machines Corporation, Armonk, N.Y.

[21] Appl. No.: 294,594

[22] Filed: Aug. 20, 1981

[51] Int. Cl.³ ............................................. G06K 7/10
[52] U.S. Cl. .................................... 235/462; 235/463
[58] Field of Search ......................... 235/462, 463, 454

[56] References Cited

U.S. PATENT DOCUMENTS 4,272,675  6/1981  Blanford ............................. 235/463
4,354,101 10/1982  Hester ................................. 235/463

FOREIGN PATENT DOCUMENTS 54-140424 10/1979 Japan .................................... 235/463

Primary Examiner—Harold I. Pitts
Attorney, Agent, or Firm—Gerald R. Woods

[57] ABSTRACT

In decoding a UPC-type label, a partial decode and majority vote technique is employed to select final values for ambiguous characters (i.e., 1-7, 2-8) appearing in the label. During the partial decode phase, character-identifying values are established for every character but a common value is assigned to any ambiguous character in a given subset of such characters. An ambiguity-resolving value is additionally assigned to an ambiguous character each time it appears. Through algebraic summation of the ambiguity-resolving values for each character position occupied by an ambiguous character, the ambiguous character which appears a majority of times in that position is finally selected.

14 Claims, 10 Drawing Figures

ODD "4"

EVEN "4"

DECODING METHOD FOR MULTICHARACTER LABELS

TECHNICAL FIELD

This invention relates to bar code scanners and more particularly to a decoding method for selecting a bar-coded label candidate from several possible candidates.

One of the more significant changes in the supermarket industry in recent years has been the general acceptance of product-identifying labels encoded using a standard bar code format. Such labels can be automatically read at a checkout stand by an optical scanning component of a point-of-sale system. Decoded label information can be used for a number of purposes, including lookup of item prices stored in the memory, performance of inventory control operations, tracking or monitoring of sales of particular items and preparation of descriptive customer receipt tapes.

Various versions of the code are in use in different countries around the world. In a given country, a UPC (Universal Product Code) format, an EAN (European Article Number) format or a JAN (Japanese Article Number) format may be in use. While the formats may differ from each other in detail, all use the same basic encoding system wherein a data character is represented by a combination of two bars alternating with two spaces.

The majority (0, 3, 4, 5, 6 and 9) of decimal characters can be decoded using certain bar-space pair measurements taken within the character. There are, however, certain decimal characters (1, 2, 7 and 8) which cannot be uniquely identified by the bar-space pair measurements alone. The bar-space pair measurements are sufficient to identify each of the two subsets (1, 7 and 2, 8) into which these characters are grouped. The final identification of a character within one of the subsets requires an additional bar width measurement. If the combined widths of the bars within a character has a magnitude falling within a first range, one of the two subset characters is indicated. If the combined width falls within the second range, the other of the two characters is indicated.

The bar code representations of the decimal values 1, 2, 7, 8 are often referred to as ambiguous characters since they cannot be fully decoded with bar-space pair measurements alone. The bar code representations of the remaining decimal values, which can be decoded with bar-space pair measurements, are sometimes referred to as non-ambiguous characters.

If the UPC labels actually printed and in use always conformed strictly to all stated standards regarding bar widths, reflectance, etc., if the scanners which read those labels always operated optimally, and if labels being scanned were always optimally oriented relative to the scanner, then multiple scans of a label would probably always result in the same label candidate. However, because labels are printed, handled and scanned under real (rather than optimal) conditions, it is not unusual for multiple scans of a single label to result in two or more different label candidates. For example, a five digit label "42736" might be read "42136," "48136," "42736" and "48736" during four scans due to the difficulty in distinguishing between ambiguous characters.

The problem which then arises is how to select the most likely of several different candidates for further processing which will finally determine whether the selected candidate is a valid one. The further processing may take the form of a modulo check. One of the characters in the label is generated when the label is created by combining the remaining characters in the label in accordance with a known algorithm. To determine whether the label has been correctly read by a scanner, those characters are recombined after decoding using the same algorithm to determine whether the calculated modulo character matches the character actually detected on the label. If the calculated and detected modulo values don't match, it is assumed that the label candidate is an invalid one.

BACKGROUND ART

It would, of course, be possible to perform a modulo check on every single different label candidate to determine which of the candidates would survive such a check. The obvious drawback to this approach is that it would require an unreasonable amount of processor time and an unreasonable amount of buffer storage. A requirement for added buffer storage affects the cost of the system. A requirement for added processor time can adversely affect system response time. If a more powerful processor is used to achieve an acceptable level of system response, the cost of the system is increased.

Another known technique is to fully decode every possible label candidate before attempting to select a particular candidate for modulo checking. The label candidate that appears most frequently is then selected for modulo checking.

While this technique is better than the more conservative technique described above, it still has some drawbacks. While this technique may require less time to carry out in practice since the most frequently occurring candidate is probably the correct candidate, a considerable amount of processor time is still required to decode all of the ambiguous characters in all of the potential candidates.

DISCLOSURE OF INVENTION

The present invention is a decoding method for more effectively selecting the best label candidate from among a plurality of label candidates resulting from several scans of the same label.

The label is a multi-character label having one or more ambiguous positions, each of which is occupied by a character included in the set of characters which is ambiguously decoded during each of multiple scans of the label. The decoding method includes the steps of deriving and storing a preliminary label value following each scan. The preliminary label value has a common set-identifying character assigned to any ambiguous position. A tentative ambiguity-resolving value is derived and stored for each ambiguous position. The tentative values for each ambiguous position are combined to select a final character value for that ambiguous position as a function of a number of times a specific character has been tentatively identified as occupying that position.

The advantage of the corroboration technique is that no effort is made to forward a label candidate for further processing until ambiguities between ambiguous characters are resolved by the majority vote technique. As a result, there will be a savings in processor time.

BRIEF DESCRIPTION OF THE DRAWINGS

While the specification concludes with claims particularly pointing out and distinctly claiming that which is regarded as the present invention, the details of a preferred implementation of the invention may be more readily ascertained from the following description when read in conjunction with the accompanying drawings wherein:

DETAILED DESCRIPTION

Figure 1:
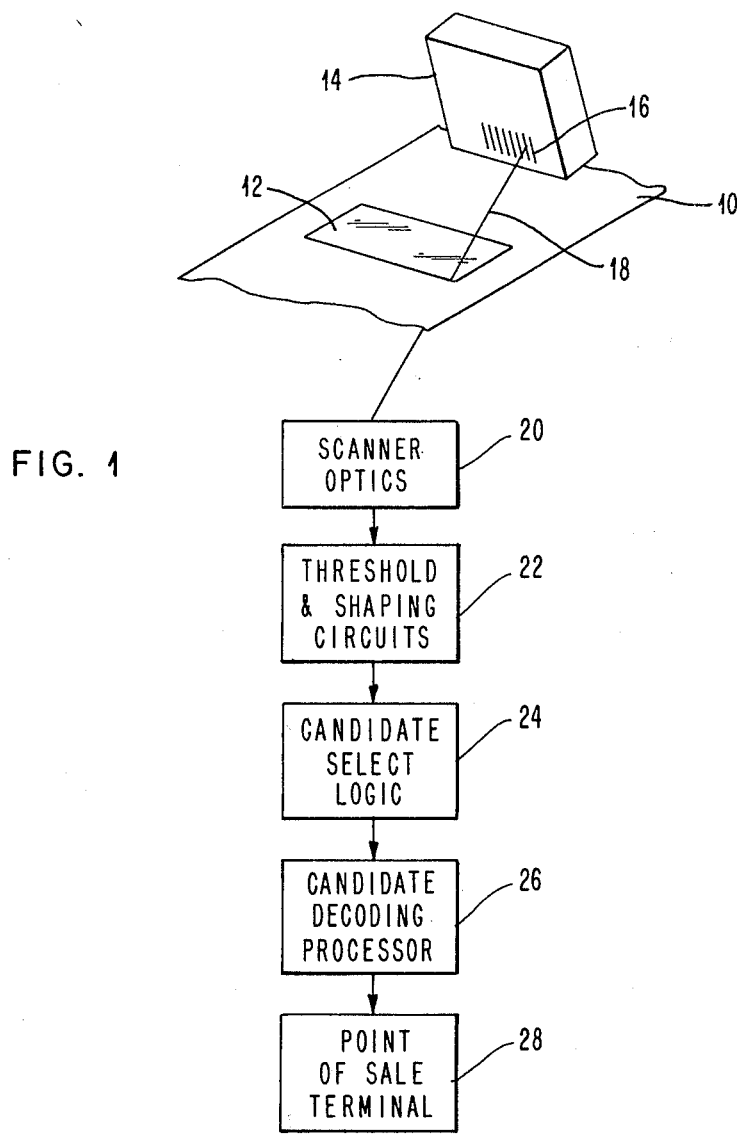
FIG. 1 is a generalized block diagram of a bar code scanning system within which the present invention may be used.

Referring to FIG. 1, a checkout stand is represented generally by a surface 10 having a transparent scanner window 12. As a grocery item 14 is moved over window 12, a bar coded label 16 on the product surface is swept one or more times by a light beam 18 which originates below the checkout stand surface in an optical subsystem 20. Light reflected from the label 16 impinges on a photosensitive element in the optical subsystem 20. Reflected light, the level of which varies as a function of the reflectance of the particular point on the package being scanned, is converted into a roughly sinusoidal electrical signal which is applied to threshold and shaping circuits 22. A function of the circuits 22 is to convert the roughly sinusoidal signal to a square wave pulse train in which the duration of each pulse bears a temporal relation to a particular light or dark area being traversed by the beam 18.

In almost all instances, a bar-coded label is surrounded by printed matter, graphics, pictorial material, etc., which may produce code-like reflections. Candidate select logic circuits 24 serve to "find" the actual label signals among the extraneous and meaningless signals produced upon scanning of printed matter, etc. When one or more label candidates has been found, those candidates are transferred to a candidate decoding processor 26, the functions of which are to select the most likely label candidate from a possible plurality of different candidates and to generate numeric representations of the selected candidates. The finally selected decoded label is then passed on to a point-of-sale terminal 28 or possibly a store controller to permit price lookup operations, inventory control operations, and perhaps other functions, to be performed.

Figure 2:
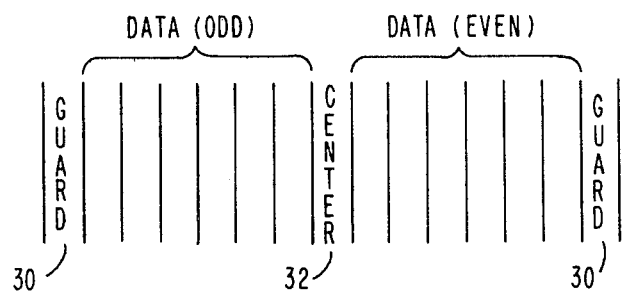
FIG. 2 shows the general format of one commonly-used type of label employing bar code characters.

Referring to FIG. 2, a widely used type of UPC label includes guard characters 30 at the left and right margins of the label. The data characters in the label are divided by a center character 32 into a left (odd) set of data characters and a right (even) set of data characters. The difference between the data characters to the left of the center character 32 and the data characters to the right of the center character 32 and the meanings of the terms "odd" and "even" are explained with reference to FIGS. 3 and 4.

Figure 3:
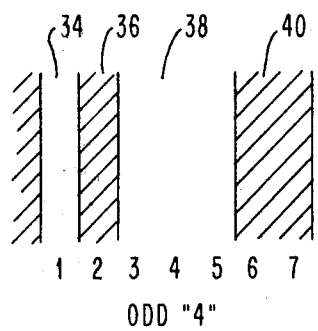
FIGS. 3 and 4 represent the two forms of the decimal character "4" as that character would appear both to the left (odd) and to the right (even) of the center character in a label.

FIG. 3 is a UPC representation of the decimal character "4" as that character would appear in the bank of the characters to the left of the center character 32. Like all data characters, the "4" character is considered to be seven modules long with each bar or space being one or more modules in width. The odd "4" character consists of a single module space 34, a single module bar 36, a three module space 38, and a two module bar 40. This particular character has at least two things in common with all of the characters appearing to the left of the center character 32. First, every character begins with a space and ends with a bar. Second, the combined width of the bars 36 and 40 is an odd number of modules; in this case, three.

Figure 4:
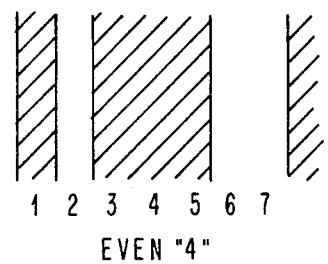

Referring to FIG. 4, when the numeral "4" appears to the right of the center character, the coded character is the binary complement or "negative image" of the left or odd "4." That is, the encoded representation has a bar in each module occupied by a space in the odd "4" and a space in each module occupied by a bar in the odd "4". Characters appearing to the right of center are referred to as even characters, since the bars occupy an even number of modules; in this case, four.

The following table is an encodation of the decimal values 0-9 as those values would be represented to the left and right of the center character on a UPC label. A "0" represents a white bar or space while a "1" represents a black or dark bar. Double or wider bars and spaces are represented by two or more adjacent identical binary characters. An inspection of the table shows that all "left" characters exhibit odd parity; that is, the combined width of the bars in each character is equal to either three or five modules. In contrast, all "right" characters exhibit even parity; i.e., the combined width of the bars in a character is always two or four modules.

TABLE 1

| DECIMAL VALUE | LEFT (ODD) CHARACTERS | RIGHT (EVEN) CHARACTERS |
|---|---|---|
| 0 | 0001101 | 1110010 |
| 1 | 0011001 | 1100110 |
| 2 | 0010011 | 1101100 |
| 3 | 0111101 | 1000010 |
| 4 | 0100011 | 1011100 |
| 5 | 0110001 | 1001110 |
| 6 | 0101111 | 1010000 |
| 7 | 0111011 | 1000100 |
| 8 | 0110111 | 1001000 |
| 9 | 0001011 | 1110100 |

A label of the type shown in FIG. 2 is found or framed and then decoded ½ at a time. That is, the candidate select logic will identify as a possible label any stream of data characters bounded by a center character and a guard character. The actual decoding of any candidate begins at the center character and proceeds one character at a time toward the guard characters. The left and right label halves are combined only after decoding.

Figure 5:
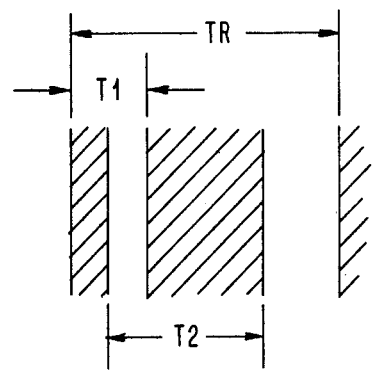
FIG. 5 depicts a UPC character and is labeled to show certain measurements used in the decoding of characters.

Within a given label, all data characters have the same physical width. From one label to the next, the absolute width of the data characters may vary over roughly two-to-one range. For that reason, a UPC label is decoded as much as possible using relative width measurements rather than absolute width measurements. Referring to FIG. 5, three of the width measurements used in the decoding process are defined there. Measurement T1 represents the combined width of the first bar-space pair in the character in the direction of decoding. Measurement T2 is equal to the combined width of the first space-bar pair in the direction of decoding. The measurement TR represents the total width of the two bars and two spaces which make up the character. A fourth measurement, not illustrated, which may be needed to decode the "ambiguous" characters 1, 2, 7, 8 is ΣTB which is equal to the combined widths of the two black bars in the particular data character. In practice, all of these measurements are expressed as the number of constant frequency pulses or counts produced by a high speed oscillator as the relevant region is traversed by the scanning beam. For example, assume the system uses a 7 MHz oscillator and that the scanning beam requires 30 microseconds to traverse an entire character. Under those conditions, TR would equal $30 \times 10^{-6}$ sec. $7 \times 10^6$ counts/sec or 210 counts.

The majority of decimal values (0, 3, 4, 5, 6 and 9) can be decoded using the T1, T2 and TR measurements. These measurements are normalized within the decoding process into N1 and N2 values in accordance with the following equations.

$$N1 = \frac{7T1}{TR} \quad (1)$$

$$N2 = \frac{7T2}{TR} \quad (2)$$

Since each data character is considered to be seven modules wide, the N1 and N2 values are actually normalized representations of the T1 and T2 measurements, respectively.

TABLE 2

| LEFT (ODD) | N1 | N2 | RIGHT (EVEN) | N1 | N2 |
|---|---|---|---|---|---|
| 0 | 2 | 3 | 0 | 5 | 3 |
| 1 | 3 | 4 | 1 | 4 | 4 |
| 2 | 4 | 3 | 2 | 3 | 3 |
| 3 | 2 | 5 | 3 | 5 | 5 |
| 4 | 5 | 4 | 4 | 2 | 4 |
| 5 | 4 | 5 | 5 | 3 | 5 |
| 6 | 5 | 2 | 6 | 2 | 2 |
| 7 | 3 | 4 | 7 | 4 | 4 |
| 8 | 4 | 3 | 8 | 3 | 3 |
| 9 | 3 | 2 | 9 | 4 | 2 |

The values of N1 and N2 for the odd and even decimal values are shown in Table 2. The various unique combinations of N1 and N2 values which result from the application of equations 1 and 2 are sufficient to fully identify the six non-ambiguous decimal values 0, 3, 4, 5, 6 and 9. The table shows, however, that 1 cannot be distinguished from 7 in either the odd or the even set of characters since both have the same N1 and N2 values. Similarly, 2 cannot be distinguished from 8 on the basis of N1 and N2 values alone.

To distinguish a 1 from a 7 or a 2 from an 8, an additional measurement is required. The additional measurement is the bar width measurement ΣTB, representing the combined width of the two bars in the data character. In the decoding process, the ΣTB is normalized to yield an NB value in accordance with the formula:

$$NB = \frac{7 \Sigma TB}{TR} \quad (3)$$

The combined widths of the bars of the two possible characters in a subset (for example, odd 1, odd 7) are always different and can be used to distinguish one of the subset characters from the other. For example, NB for odd 1 is equal to three while NB for odd 7 is equal to five.

The idealized, normalized NB values for the ambiguous characters 1, 2, 7, 8 are listed below in Table 3. These NB values are needed to fully decode those characters.

TABLE 3

| LEFT (ODD) | NB | RIGHT (EVEN) | NB |
|---|---|---|---|
| 1 | 3 | 1 | 4 |
| 2 | 3 | 2 | 4 |
| 7 | 5 | 7 | 2 |
| 8 | 5 | 8 | 2 |

The N1, N2 values are sufficient to determine whether an ambiguous character is in the odd or the even set of ambiguous characters. Similarly, the N1, N2 values indicate whether the ambiguous character is in the 1, 7 subset or the 2, 8 subset. To determine at least tentatively which of the two possible characters has been read, the N1, N2, NB values are used in one of the two following formulas, depending on whether the character is in the odd or even set:

$$\frac{2NB}{1 + N1 + N2} \quad \text{(For Odd Characters)} \quad (4)$$

$$\frac{2(7 - NB)}{1 + (7 - N1) + N2} \quad \text{(For Even Characters)} \quad (5)$$

For odd characters, the results of formula 4 will always be less than 1 for a 1 or a 2 and greater than or equal to 1 for a 7 or an 8. Similarly, for even characters, the results of formula 5 will always be less than 1 for a 1 or a 2 and greater than or equal to 1 for a 7 or an 8. This is summarized in Table 4 below.

TABLE 4

| IDENTIFIED SUBSET | VALUE OF FORMULA (4), (5) | |
|---|---|---|
| | <1 | ≧1 |
| ODD 1, 7 | ODD 1 | ODD 7 |
| ODD 2, 8 | ODD 2 | ODD 8 |
| EVEN 1, 7 | EVEN 1 | EVEN 7 |
| EVEN 2, 8 | EVEN 2 | EVEN 8 |

For reasons which will be explained in more detail below, algebraic values of equal magnitude and opposite polarity are assigned depending on whether the selected formula produces a result less than 1 or greater than or equal to 1. For example, if either formula 4 or formula 5 produces a result less than 1, an arbitrary value of −1 is assigned. If either formula produces a result greater than or equal to 1, an algebraic value of +1 is assigned. The actual results of the computations are referred to as D. The algebraic values assigned as a function of the results are referred to as D′.

In the decoding method to be described below, the term "character identifiers" is frequently used. For a non-ambiguous character, the character identifiers are the N1, N2 values defined above. For ambiguous characters, the identifiers are N1, N2 and D′, also defined above.

Figure 6:
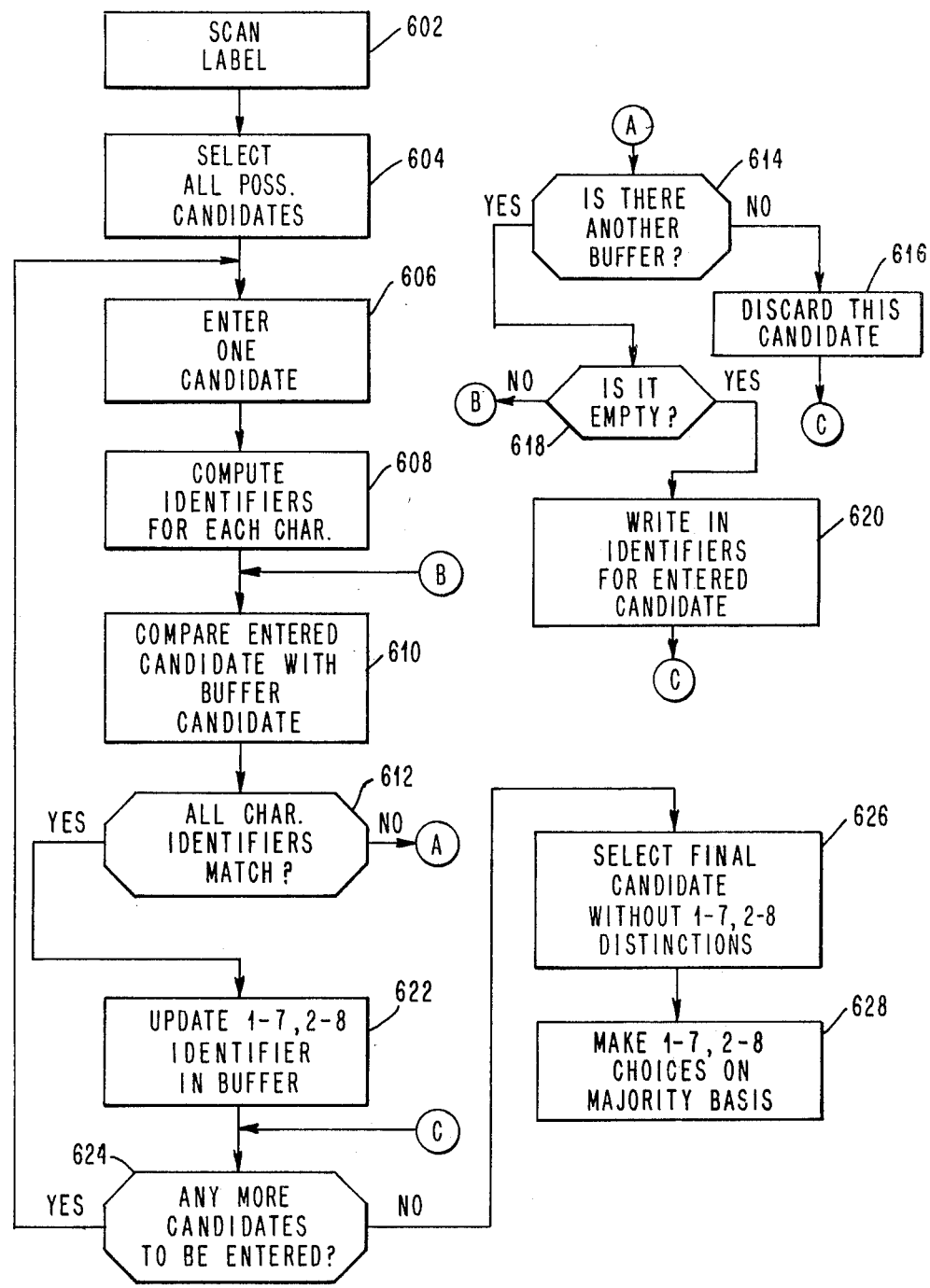
FIG. 6 is a general flow chart of a decoding method employing the present invention.

Referring now to FIG. 6, which is a block diagram showing the decoding method in very general terms, the bar coded label to be decoded must obviously be scanned (block 602) before decoding can be performed. When all possible label candidates are selected (block 604) from the scan results, one label candidate is entered (block 606). The identifiers for each of the characters in that candidate are computed (block 608) and then compared on a character-by-character basis with stored identifiers (block 610) for a previously entered label candidate, if any. If not all of the character identifiers for the entered candidate match corresponding identifiers for the stored candidate (block 612), a check is made (block 614) to determine whether another buffer is yet to be checked from the array of candidate buffers. If all of the buffers have been checked and no match has been found, the currently entered candidate is discarded. If another buffer has yet to be checked, then it must be determined (block 618) whether that buffer is empty. If the buffer is not empty, meaning a previously selected candidate is stored therein, the program returns to block 610 and the identifiers for the entered candidate are compared with the identifiers for the candidate in the newly selected buffer. If, however, the check of block 618 shows the newly selected buffer to be empty, the identifiers for the entered candidate are written into the previously empty buffer (block 620).

If the check made at block 612 indicates that the identifiers for all characters in the entered candidate match the identifiers for all characters in the candidate stored in the selected buffer, the 1-7, 2-8 identifier or "D'" value for each ambiguous character is updated in the selected buffer (block 622). A check is then made (block 624) to determine whether any more candidates are to be entered. The program is also re-entered at block 624 after a candidate has been discarded (block 616) or after a candidate has been written into a previously empty buffer (block 620).

If there are more candidates to be processed, the program loops back to block 606 and a new candidate is entered and processed. If the check made at block 624 indicates that there are no additional candidates to be processed, a "plurality" vote is taken (block 626) to determine which candidate appeared the greatest number of times. This candidate is selected as the final buffer candidate. It should be noted the buffer candidate is selected for full decoding without attempting to distinguish between a 1 and a 7 or a 2 and an 8. All non-ambiguous characters are decoded using N1, N2 values and choices between a 1 and a 7 or a 2 in the final candidate are made on a majority vote basis (block 628). The fully decoded final candidate is transferred within the system for modulo checking.

Figure 7:
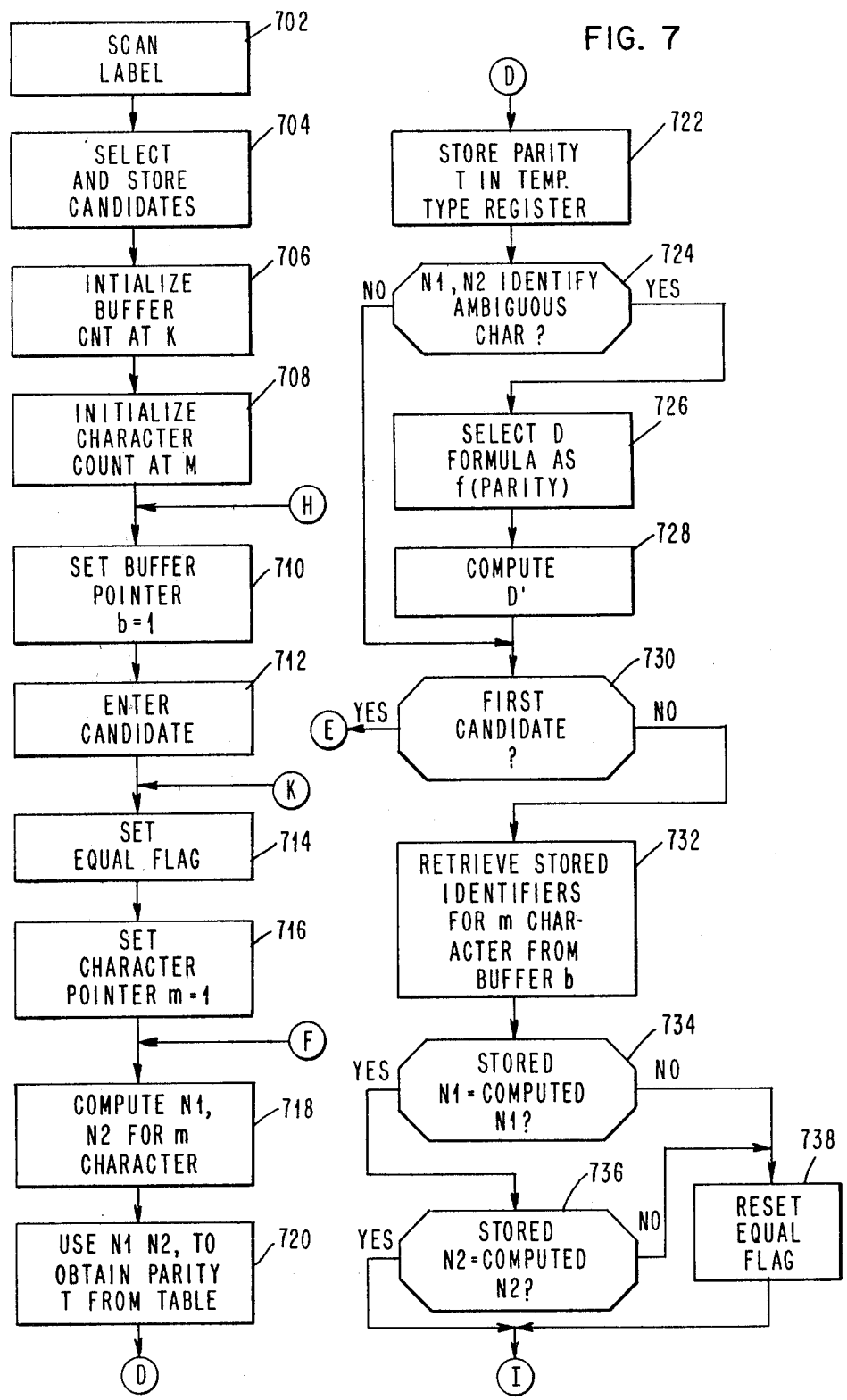
FIGS. 7 through 10, taken together, are a more detailed flow chart of the decoding method represented generally in FIG. 6.
Figure 8:
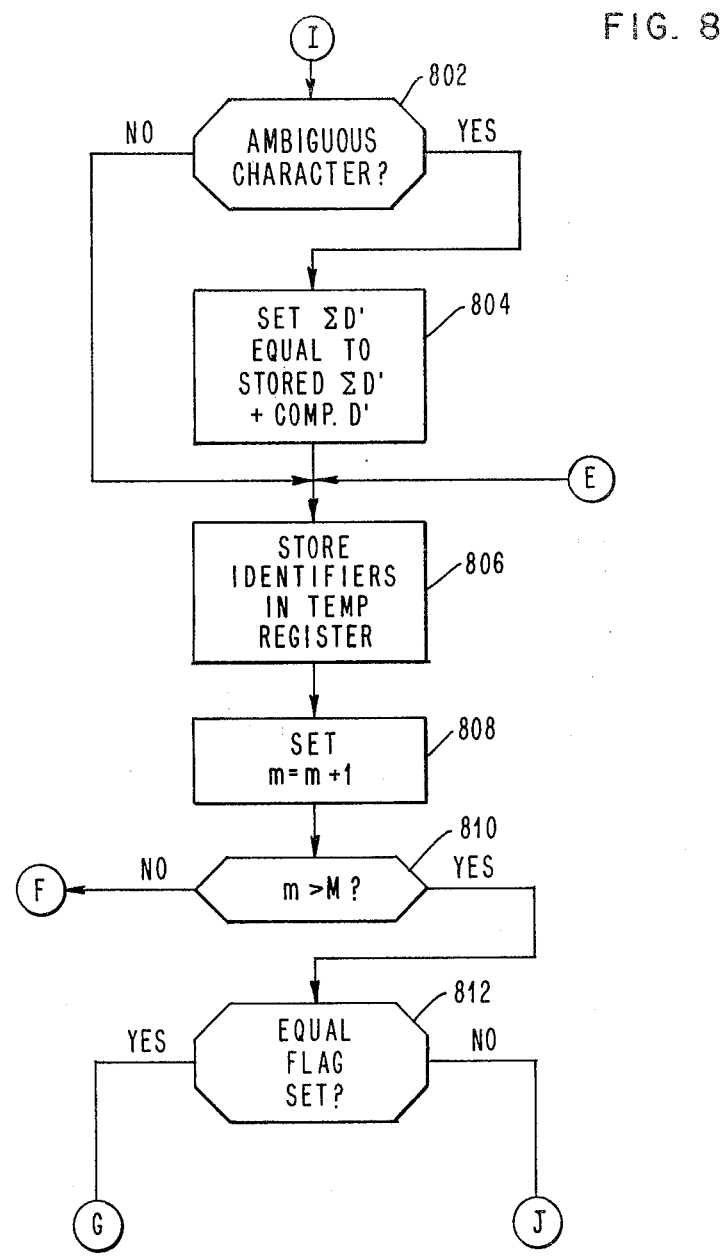
Figure 9:
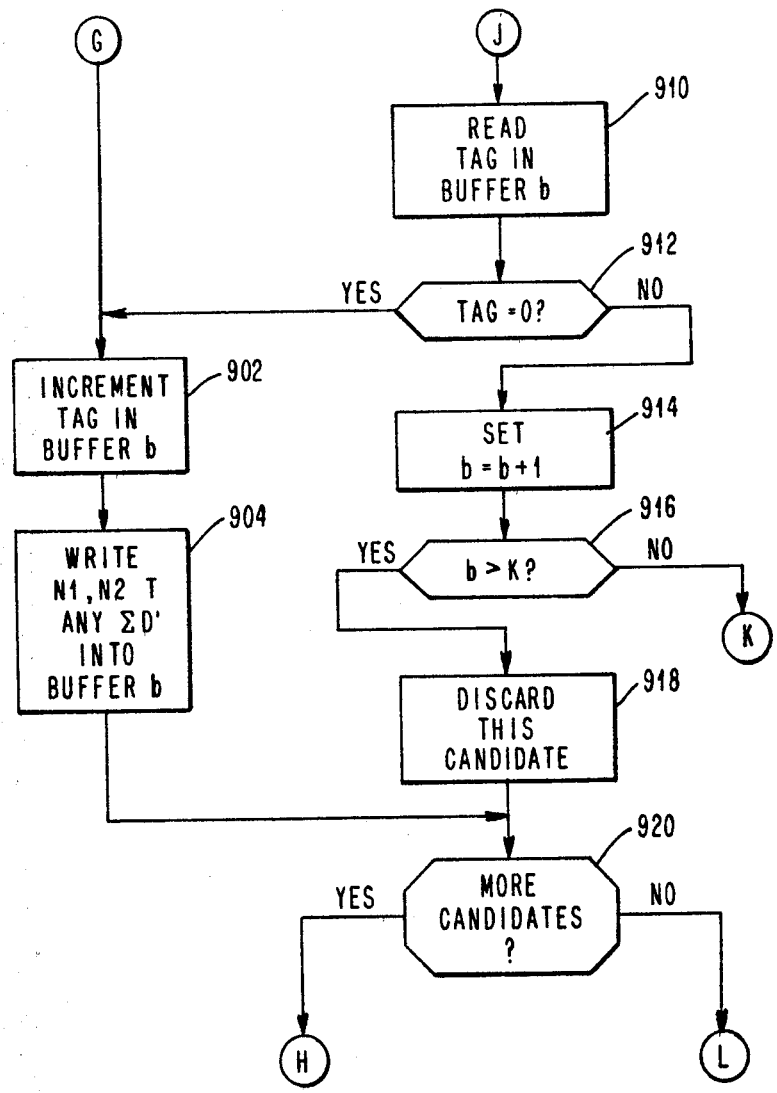
Figure 10:
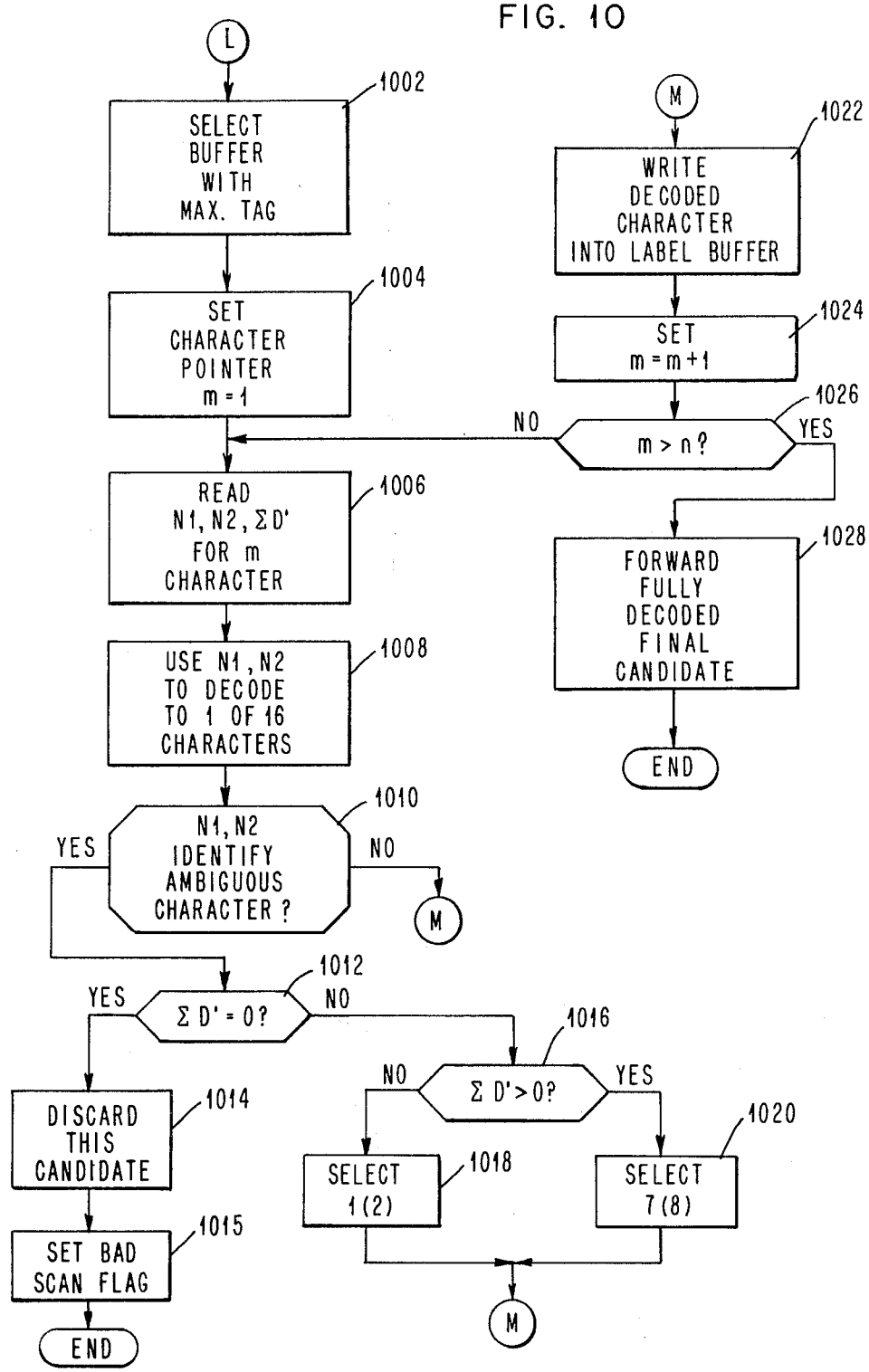

The decoding method is described in much greater detail in FIGS. 7, 8, 9 and 10, which, taken together, constitute a detailed flow diagram of the entire technique. Referring to FIG. 7, when the label has been scanned (block 702) and all candidates have been selected and stored and stored as a series of pulse width counts (block 704), the number of buffers to be used for decoding the particular type of scanned label is initialized at a quantity K (block 706). The character count or number of characters in the label to be decoded is initialized at a quantity M (block 708). A buffer pointer b is then set to 1 (block 710) to point to the first of the available buffers. After a candidate is entered (block 712), an equal flag is set (block 714). As will be explained in more detail later, the value of the equal flag at the end of a comparison phase is an indication whether or not an entered candidate matches a previously entered candidate.

A character pointer m is then set to 1 (block 716) to point to the first character to be decoded in the entered label. The values N1, N2 are computed (block 718) in accordance with the equations (1) and (2). The computed N1, N2 values are used (block 720) to obtain a parity value T from a lookup table which is the electronic equivalent of Table 2 above. The parity value obtained is stored (block 722) in a temporary Type register.

A check must then be made (block 724) as to whether the computed N1, N2 values have identified an ambiguous character. If a 1-7 or a 2-8 is indicated by the N1, N2 values, then either formula 4 of formula 5 must be called up (block 726) as a function of the parity of the decoded character. The value of D is computed (block 728). If D is less than 1, D' is set to $-1$. If D is greater than or equal to 1, a $+1$ value is assigned to D'.

If the check at block 724 resulted in identification of a non-ambiguous character, there is no need for a computation of a D value. The program would skip blocks 726 and 728 and go directly to a block 730 where a check is made as to whether or not the currently entered candidate is the first candidate to be processed. If it is the first candidate, the character being decoded obviously cannot be compared with any corresponding character in a previously entered candidate. The program skips a number of steps which will be discussed below and goes directly to an operation 806 in which the computed identifiers for the character are stored in a temporary register. The character pointer m is incremented (block 808) and a check is made as to whether the value of m is greater than M, which would indicate that all of the characters in the entered candidate have been processed. If the check in block 810 indicates there are characters in the label yet to be processed, the program loops back to operation 718 at which the values of N1, N2 are computed for the next character in the label. If, however, the check at block 810 indicates that all of the characters have been processed, another check 812 must then be made as to whether the equal flag is set. Since the first candiate to be entered can't be compared to any other candidate, the equal flag will always be reset for the first candidate.

Assuming the equal flag is set, a tag value (which would be 0 for the first condidate) is incremented (block 902) in the selected buffer b. The character identifiers for all of the characters in the candidate are written into buffer b (block 904). For non-ambiguous characters, the identifiers are N1, N2. Ambiguous characters are identified by N1, N2 and a $\Sigma D'$ value which is obtained in a manner to be described in more detail later.

After the character identifiers for the first label candidate are written into the buffer b, a check is made (block 920) as to whether there are any more candidates to be processed. If there are, the program is resumed at the entry of block 710. The buffer pointer is again set to the first buffer and the next candidate is entered.

The process of computing character identifiers is repeated for the second candidate. When the program reaches block 730, however, the check made there will indicate that the currently entered candidate is not the first candidate. At this point, the stored identifiers for each character under consideration are retrieved from storage in buffer b (block 732) and comparisons are performed (block 734 and 736) between the stored and computed values of N1 and N2, respectively. If any mismatch is found in either of these checks, the equal flag is reset (block 738) and the program proceeds to decision block 802. If the stored and computed N values are equal, the program goes directly to block 802 where a check is made as to whether the character is an ambiguous one. If it is, a stored value of $\Sigma D'$ is altered by the magnitude of the computed quantity D' (block 804). If the character is not an ambiguous character, operation 804 is bypassed. The computed identifiers for the character under consideration are stored in the temporary register (block 806) and character pointer m is incremented to permit the same set of comparisons to be made for the next character in the currently entered label candidate. When all of the characters in the entered candidate have been compared to corresponding characters in the previously entered and stored candidate, a check is made (block 812) to determine whether the equal flag remains set. If the equal flag is set, indicating that the entered candidate matches the stored candidate, the tag value in the accessed buffer (block 902) is incremented to indicate that the same label candidate has been found a number of times equal to the tag value.

At this point, no effort is made to distinguish between a 1 and 7 or a 2 and an 8. The final choice between each of the two possible characters is made at a later point as a function of $\Sigma D'$ for the character position in question. The values N1, N2, T and any $\Sigma D'$ values for the entire label candidate are then loaded into the accessed buffer (block 904). Since the N1, N2 and T values should match those already in the buffer, there will be no change in buffer contents for these values. Any $\Sigma D'$ values which are loaded into the buffer are necessarily different from the $\Sigma D'$ values previously stored there. Once the write operation is completed, a check (block 920) is made as to whether there are any more candidates to be processed. If there are, the program loops back to block 710. The next candidate is entered and is compared to the candidate previously stored in buffer 1 on a character-by-character basis.

If however, the check at block 812 and indicated that the equal flag was reset due to a mismatch in any character position, the tag value in buffer b (block 910) is read. If the tag value is 0, indicating that the buffer is empty, the program branches to block 902 and causes the newly entered candidate to be written into the empty buffer. If the tag value in the accessed buffer is not equal to 0, indicating that there is already a dissimilar candidate stored in that buffer, the buffer pointer is incremented (block 914) and a check is made (block 916) as to whether the buffer pointer is still pointing at a buffer within the acceptable range. If the buffer pointer value is greater than the number of buffers allocated for this purpose, the candidate is discarded (block 918) and the check 920 is made as to whether there are any more candidates to be processed.

If the incremented buffer pointer indicates that there is another buffer in the set which either may be empty or may contain a label candidate to be compared with the currently entered candidate, the program returns to block 714. The equal flag is set and the characters in the entered candidate are compared one at a time to the characters in the newly accessed buffer.

This process is repeated with each newly entered candidate being compared to the candidates previously stored in the buffers until:

(1) a match is found between the entered candidate and a previously stored candidate, in which case the tag value and the $\Sigma D'$ values for any ambiguous characters are altered in the accessed buffer;

(2) no match can be found between the entered candidate and any of the candidates stored in the buffers but an empty buffer is available, in which case the entered candidate is written into the previously empty buffer; or (3) no match can be found between the entered candidate and any previously stored candidates and no buffers are available, in which case the entered candidate is discarded.

Once the check 920 indicates that no more candidates are available for processing, the program enters a final decoding phase. This phase of the program begins at block 1002 where the buffer pointer b is set to point to the buffer in the array having the maximum tag value; that is, the buffer containing the partially decoded candidate which appeared the greatest number of times. The character pointer is set to point to the first character in that buffer (block 1004). The values of N1, N2 and any $\Sigma D'$ for the character are read from the buffer (block 1006). The N1 and N2 values are used (block 1008) to decode to one of 16 possible characters. The 16 characters consist of odd 1–7 (treated as a single character), odd 2–8 (treated as a single character), odd 3, odd 4, odd 5, odd 9, odd 0, even 1–7 (treated as a single character), even 2–8 (treated as a single character), even 3, even 4, even 5, even 6, even 9, and even 0.

Once the partial decode has been performed, a check (block 1010) is made to find out whether the N1, N2 values indicates an ambiguous character. If a non-ambiguous character is indicated, the program branches to a write operation (block 1022) in which the decoded character is written into a label buffer.

If check 1010 reveals an ambiguous character, a second check (block 1012) is made to determine whether the value of $\Sigma D'$ is equal to 0. If $\Sigma D'$ is equal to 0, indicating that an ambiguous character was tentatively identified as one of two possible characters the same number of times that it was identified as the other of the two possible characters, the candidate is discarded (block 1014) and a "bad scan flag" is set (block 1015) to allow the operator to be notified that the item should be re-scanned. The program loops to its entry point at block 702 under these conditions.

If block 1012 indicates that the value of $\Sigma D'$ is equal to something other than 0, then a decision is made (block 1016) as to whether $\Sigma D'$ is greater than or less than 0. If $\Sigma D'$ is less than 0, the ambiguous character is either a 1 or a 2 (block 1018). If $\Sigma D'$ is greater than 0, the ambiguous character is taken to be a 7 or an 8 (block 1020). The process of selecting one or the other of the ambiguous characters amounts to a majority vote technique since the algebraic sign of $\Sigma D'$ is clearly a function of which of the two possible choices occurred more often.

When a final choice is made between one of the two possible ambiguous characters, that decoded character is written into the label buffer (block 1022) and the character pointer is incremented block 1024). If the character pointer is still within the permissible range of characters (block 1026) the decode loop is re-entered at block 1006 to fully decode the next character. When all of the characters in the label have been fully decoded, the now fully decoded final candidate is forwarded within the system for modulo checking.

Conceptually, both majority vote decisions and a plurality vote decision are made in finally choosing the label candidate on which a modulo check is performed.

The plurality vote is used to choose that partially decoded candidate which appeared more frequently than any other complete candidate. The majority vote is used to choose one of two possible ambiguous characters in a given character position as a function of which of those two characters appeared most frequently during preliminary decoding.

Having thus described my invention, what I desire to protect by Letters Patent is:

1. A method of decoding a multicharacter label having one or more ambiguous positions, each of which is occupied by a character included in a set of characters which is ambiguously decoded during each of multiple scans of the label, said method including the steps of:
   (a) deriving and storing a preliminary label value following each scan, said preliminary label value having a common set-identifying character assigned to any ambiguous position;
   (b) deriving and storing a tentative specific character value for each ambiguous position;
   (c) comparing preliminary label values derived from the multiple scans of the same label to determine whether a particular preliminary label value is corroborated by one or more matching values; and
   (d) assigning a final character value for each ambiguous position as a function of the number of times a specific character has been tentatively identified as occupying that position.

2. For use in a label scanning system of the type wherein a plurality of multicharacter label candidates may be generated as a result of multiple scans of a label, an improved decoding method comprising:
   (a) deriving and storing a set of up to three indicators for each character segment in each label candidate, two of said three indicators being capable of identifying either individual characters or subsets of characters, said third indicator being capable of identifying a particular character within a given subset;
   (b) comparing the first two indicators for each character segment in a given candidate to the corresponding indicators for a corresponding character segment in at least one other label candidate to determine whether the label candidates have matching characters or matching subsets of characters;
   (c) accumulating the third indicators for corresponding character segments until all label candidates have been compared; and
   (d) selecting a particular character for each character segment identified as being occupied by a subset as a function of the accumulated third indicator values for that segment.

3. An improved decoding method as recited in claim 2 wherein the label to be decoded consists of a plurality of bar-coded character segments, each consisting of an equal number of bars and spaces and wherein said first and second indicators are derived by forming ratios of the combined widths of successive bar-space pairs to the total character segment width.

4. An improved decoding method as recited in claim 3 wherein said third indicator is derived as a function of the combined bar widths in a segment and of the magnitudes of the first and second indicators.

5. An improved decoding method as recited in claim 4 wherein said first indicator N1 and said second indicator are derived by the equations $$N1 = \frac{7T1}{TR} \qquad N2 = \frac{7T2}{TR}$$

where
   T1 is the combined width of the first bar-space pair in the character segment,
   T2 is the combined width of the first space-bar pair in the character segment, and
   TR is the combined width of the two bars and spaces which comprise the character segment.

6. An improved decoding method as recited in claim 5 wherein individual characters or subsets of characters are classified as odd or even depending on the derived values N1 and N2 and wherein the third indicator is established as $$\frac{2NB}{1 + N1 + N2} \text{ for odd characters or}$$

$$\frac{2(7 - NB)}{1 + (7 - N1) + N2} \text{ for even characters}$$

where NB is the total bar width of the character segment.

7. An improved decoding method as recited in claim 6 wherein an absolute value D' having one algebraic sign is assigned to the third indicator where that indicator value is equal to or greater than a given threshold value while the same absolute value D' having the opposite algebraic sign is assigned to the third indicator where that indicator value is less than the given threshold value.

8. An improved decoding method as recited in claim 7 wherein the third indicator is accumulated by summing the algebraic values D' with a positive result representing one of two possible characters in a subset and a negative result representing the other of the two possible characters.

9. An improved decoding method as recited in claim 2 including the additional steps of storing a tag value for each label candidate representing the number of times that candidate has been decoded and selecting the label candidate having the greatest tag value for further processing.

10. For use in a label scanning system of the type wherein a plurality of multicharacter label candidates are generated as a result of multiple scans of a label, an improved decoding method comprising:
   (a) deriving and storing at least one character-related indicator for each character segment in each label candidate capable of identifying either an individual character or a subset of two possible characters;
   (b) deriving and storing an ambiguity-resolving indicator for each character segment, said ambiguity-resolving indicator being capable of identifying a particular character within a subset of characters;
   (c) comparing each label candidate to at least one other label candidate on a segment-by-segment basis to determine whether the compared labels have matching character-related indicators in each segment;
   (d) generating and storing a sum representing the number of times ambiguity-resolving indicators for a particular segment have indicated one subset character relative to the number of times said indicators have indicated the other of the subset characters; and (e) assigning a specific character value of each character segment occupied by a subset as a function of the stored sum for that segment.

11. An improved decoding method as recited in claim 10 further including the step of generating and storing a tag value indicative of the number of times a label candidate has been matched with other label candidates having the same characters or subsets of characters in corresponding segments.

12. An improved decoding method as recited in claim 11 including the additional step of selecting a label candidate for further processing as a function of the relative tag values of the stored candidates.

13. In a label scanning system of the type wherein a plurality of multicharacter label candidates are generated as a result of multiple scans of a label, an improved decoder comprising:
(a) means for deriving at least one character-related indicator for each character segment in each label candidate, said indicator being capable of identifying either a particular character or a subset of characters;
(b) means for storing said character-related indicators;
(c) means for deriving an ambiguity-resolving indicator for at least those character segments identified as being occupied by a subset, said ambiguity-resolving indicator being capable of identifying a particular character within a subset;
(d) means for comparing the character-related indicators for each label candidate with the character-related indicators for at least one other label candidate to determine whether the compared candidates have matching indicators for corresponding segments;
(e) means for algebraically combining ambiguity-resolving indicators for at least those corresponding segments occupied by subsets to determine which of two possible characters is indicated more often; and
(f) means for assigning a particular character value to any segment for which a subset was identified as a function of the output of said algebraic combining means.

14. An improved decoder as recited in claim 13 further including means for determining the number of times a particular label candidate has been identified on the basis of matching character-related indicators and for storing a corresponding tag value.

* * * * *